United States Patent

Rogers et al.

[15] 3,686,479

[45] Aug. 22, 1972

[54] STATIC READER SYSTEM FOR MAGNETIC CARDS

[72] Inventors: Waldo I. Rogers, Arcadia; Denis L. Van Pelt, Westminster, both of Calif.

[73] Assignee: Rusco Industries, Inc., Los Angeles, Calif.

[22] Filed: May 17, 1971

[21] Appl. No.: 143,978

[52] U.S. Cl. ....................235/61.11 D, 340/174.1 H, 179/100.2 CF

[51] Int. Cl. ............................G06k 7/08, G11b 5/00

[58] Field of Search ...............235/61.11 D, 61.12 M; 179/100.2 R, 100.2 C, 100.2 CF; 340/174.1 F, 174.1 H; 346/74 M

[56] References Cited

UNITED STATES PATENTS

| | | | |
|---|---|---|---|
| 2,915,597 | 12/1959 | Wanlass et al. | ....179/100.2 CF |
| 3,146,393 | 8/1964 | Gibbon | ................340/174.1 F |
| 3,210,527 | 10/1965 | Daykin | ...............235/61.11 D |
| 3,452,358 | 6/1969 | Zehner | ................340/174.1 F |
| 3,619,570 | 11/1971 | Grosbard | ............235/61.11 D |

*Primary Examiner*—Daryl W. Cook
*Attorney*—Perry E. Turner

[57] ABSTRACT

A plurality of parallel electromagnetic sensors extend from one wall of a housing, and a card is slidably inserted between the opposite wall and the remaining ends of the sensors so that magnetic spots in the card have their fields coaxially aligned with the sensors. Each sensor has a core of high initial permeability that is substantially saturated by the card spot aligned therewith. The coils of the sensors are pulsed for reading data in the card, and are included in a system which utilizes the aiding and opposing relations of the fields of the coils and card spots to develop binary logic signals. Different arrangements are shown for exciting the coils serially and in parallel, and for establishing binary logic signals by magnitude or phase detection.

8 Claims, 14 Drawing Figures

Patented Aug. 22, 1972

3,686,479

2 Sheets-Sheet 1

INVENTORS
WALDO I. ROGERS
DENIS L. VAN PELT
BY Perry E. Turner
ATTORNEY

INVENTORS
WALDO I. ROGERS
DENIS L. VAN PELT
BY Gerry E. Turner
ATTORNEY

STATIC READER SYSTEM FOR MAGNETIC CARDS

Background of the Invention

1. Field of the Invention

This invention relates to static reader systems utilizing electromagnetic sensors for magnetic card in which data is recorded in spots.

2. Description of the Prior Art

In static reader systems heretofore known which utilized electromagnetic means for sensing positions of magnets in cards, transformers are arranged wherein magnetic cards are adapted to be placed between the primary and secondary windings, and wherein the card magnets effect the needed coupling in order to establish output voltages in the secondaries. In such arrangements the transformers must be spread out to avoid coupling among adjacent transformers. Such readers are unduly expensive and wasteful of space, and are capable at one setting of reading only a small fraction of the desired number of different card codes.

SUMMARY OF THE INVENTION

This invention embraces a system wherein each of a plurality of parallel electromagnets with highly permeable saturable cores with which magnetized spots in a card are aligned, each core being substantially saturated by the card spot aligned therewith, means for selectively energizing the coils from a pulse source, and logic detection means responsive to each energized coil to effect a binary output signifying whether the field of the coil aids or opposes the field of the associated card spot.

Figure 3:
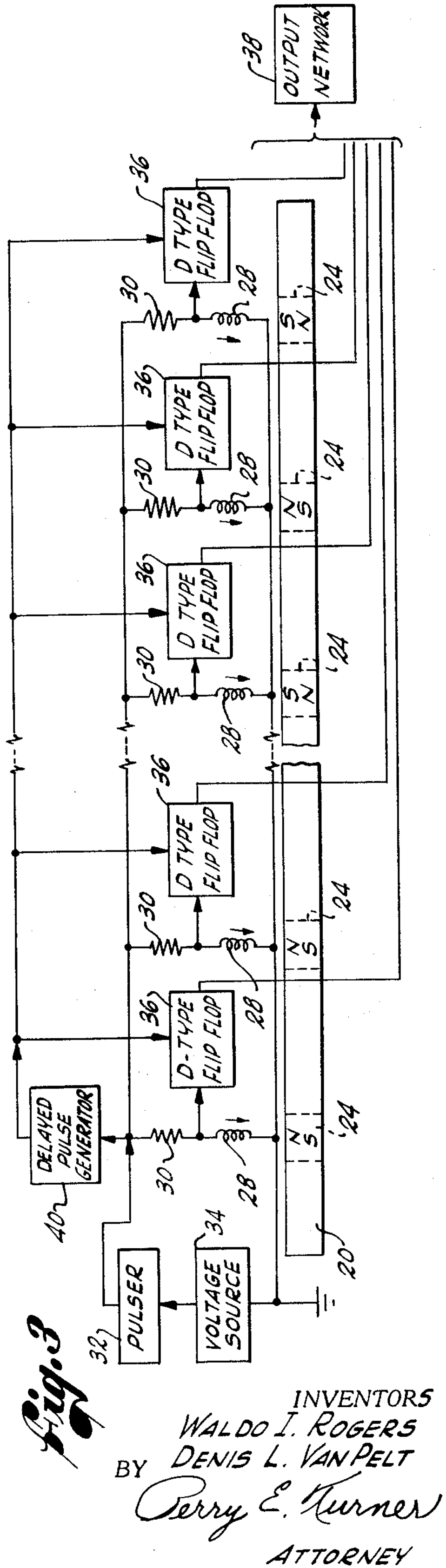
FIG. 3 is a block diagram of a system in accordance with the invention for simultaneously energizing the electromagnet coils from a pulse source, and for developing a logic level signal from each coil that signifies whether the field of the associated card spot is in aiding or opposing relation with the field of the coil.
Figure 5:
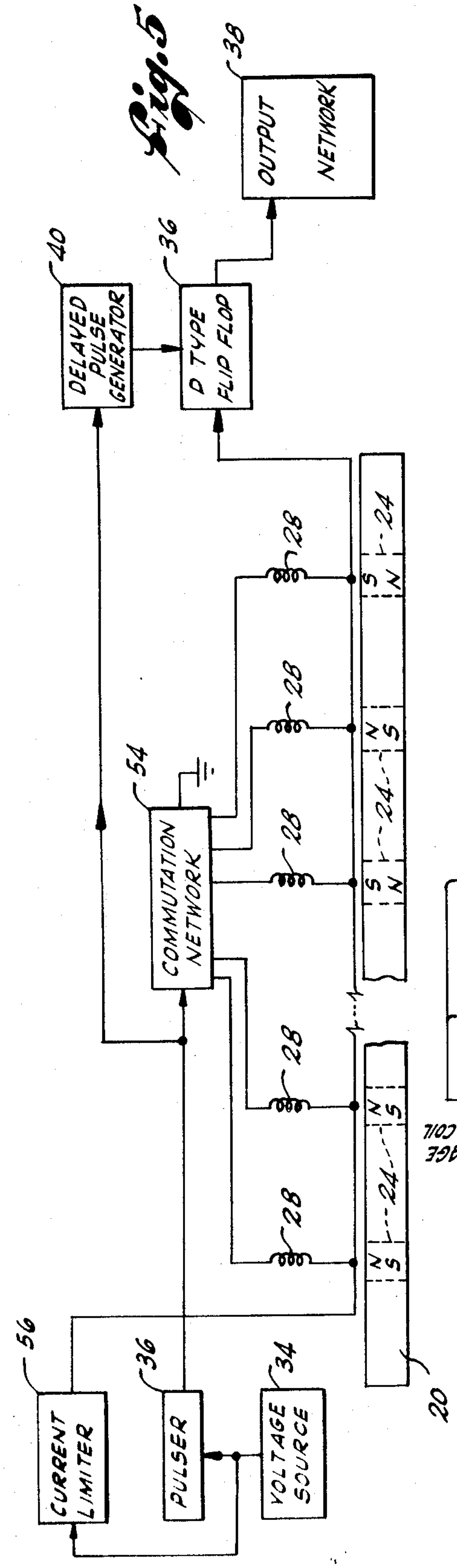
Figure 7:
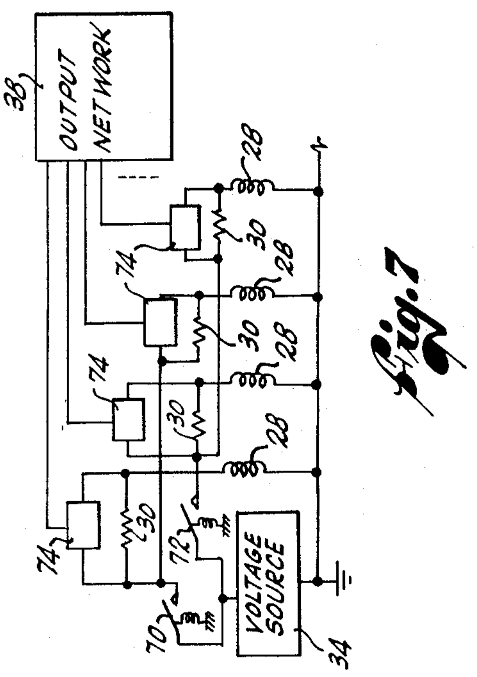
Figures 6A, 6B, 6C, 6D, 6E:
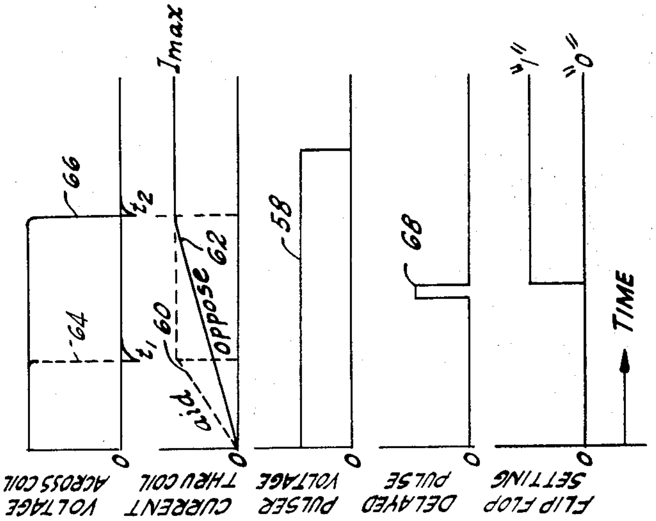

FIG. **4*a*–4*d* are graphs to aid in explaining the operation of the block diagram of FIG. 3**;

FIG. 5 is a block diagram of a system of the invention wherein the coils are serially energized from a pulse source;

FIGs. *6a–6e* are graphs to aid in explaining the operation of the system of FIG. 5; and FIG. 7 is a block diagram of another amplitude detection system in accordance with the invention.

DESCRIPTION OF ILLUSTRATIVE EMBODIMENTS

Figure 1:
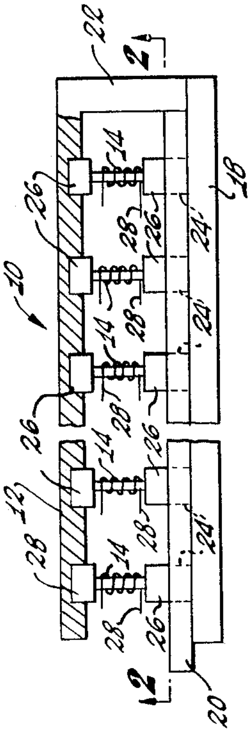
FIG. 1 is a fragmentary side elevation view of a housing with an assembly of electromagnets therein, showing the cores of the electromagnets extending from one wall, and a card slidably positioned between the remaining ends of the cores and the other wall, such card having spots aligned with respective electromagnets.
Figure 2:
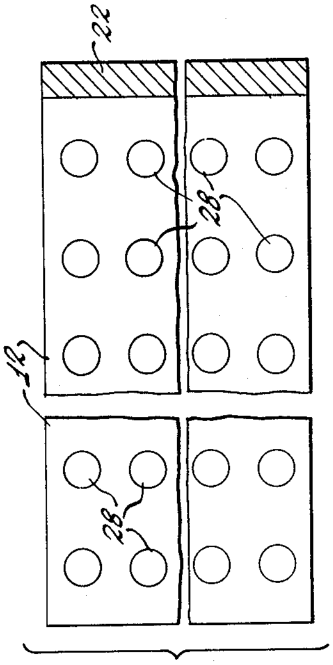
FIG. 2 is a fragmentary sectional view taken along the line 2—2 of FIG. 1.

Referring to FIGS. 1 and 2, there is shown a housing 10 having a wall 12 from which a plurality of cores 14 of electromagnets 16 extend. The cores extend to a plane that is spaced from the opposite wall 18 so that a magnetic card 20 can be slidably inserted between the cores and the wall 18. In one arrangement, the walls 12, 18 and a connecting wall 22 at one edge, are magnetic members, e.g., soft iron plates. In another arrangement, only the wall 18 is magnetic.

The card 20, which is of the size of a conventional credit or identification card, is of the type wherein finely divided material, e.g., barium ferrite, is distributed throughout a rubber or plastic base, and which is magnetized in spots 24 that are poled perpendicularly to the card faces. The distributions and orientations of the spot fields constitute data identifiable with the particular card. Regardless of the orientation of such a spot field, it extends through the associated core 14. The flux path between the upper end of the core and the lower end of the card spot is completed through the wall 18. Where the walls 12 and 22 are also magnetic, a magnetic circuit is formed wherein air gaps are limited to those at the opposite ends of the card spot.

Each core 14 has a center portion of saturable material of high initial permeability, and which requires a very low magnetomotive force to saturate it, i.e., it is characterized by a narrow B-H loop. In this latter connection, the saturation flux densities of known materials which have such characteristics are substantially greater than the flux density of the field of such a card spot. For example, the flux density of mu-metal at saturation is of the order of 8,000 gauss, which is several thousand gauss above that of a spot of material in a card as above described. However, a force corresponding to one or two ampere turns will saturate such material, and this invention enables a card spot to be used for that purpose. To this end, the cores are provided at their lower ends with pole pieces 26, e.g., soft iron, of sufficient size (e.g., approximately the diameter of a card spot) to intercept all flux from a spot aligned therewith. Such pole pieces 26 are also provided at the upper ends of the cores to simplify placement problems in assembly.

The core 14 is made so that its cross section is small enough that the flux gathered by a pole piece from a card spot is concentrated in the core. While most of the strength of the spot field is distributed elsewhere than in the core 14, i.e., in the air gaps, there is available the small force needed to overcome the reluctance of the core and magnetize it to a predetermined flux density. For small card spots, e.g., 0.125 in. in diameter, the cross section of the cores must be extremely small to achieve the desired concentration, such as 0.0002–0.0003 sq. in. in actual examples.

Referring to FIG. 3 along with FIGS. 1 and 2, respective coils 28 are wound around the cores 14, and each is connected in series with a respective resistor 30 across a source of voltage pulses, here shown as a pulser 32 connected to a voltage source 34. The junctions of the serially connected coils 28 and resistors 30 are connected to a respective binary logic network, shown as a D-type flip-flop and the outputs of each of the flip-flops 36 is connected to an output network 38. Also, each of the flip-flops 36 has a second input connected to a delayed pulse generator 40 that is operably connected to the pulser 32.

FIG. **4*b* illustrates a voltage pulse 42 from the pulser 32. Such pulse is applied simultaneously across all the serially connected coil and resistor combinations. The arrows adjacent the coils 28 indicate the directions of the magnetic fields created by the flow of current therethrough. As will be noted, the fields established through the coils in this example are in opposing relation to the fields of the spots 24 wherein the north poles are at the upper surfaces of the card 20**, and in aiding relation to the associated spots having their south poles at the upper surface of the card.

In this latter connection, the inductance of the coil whose field opposes an associated card spot is greater than the inductance of a coil whose field is in aiding relation to that of a card spot. Correspondingly, the decay of a voltage across a coil whose field opposes that of the associated card spot (see the dotted curve 44 in FIG. *4a*') *is slower than that across a coil whose field is in aiding relation to its card spot (see the solid curve 46 in FIG. 4a ).*

Figures 4A, 4B, 4C, 4D:
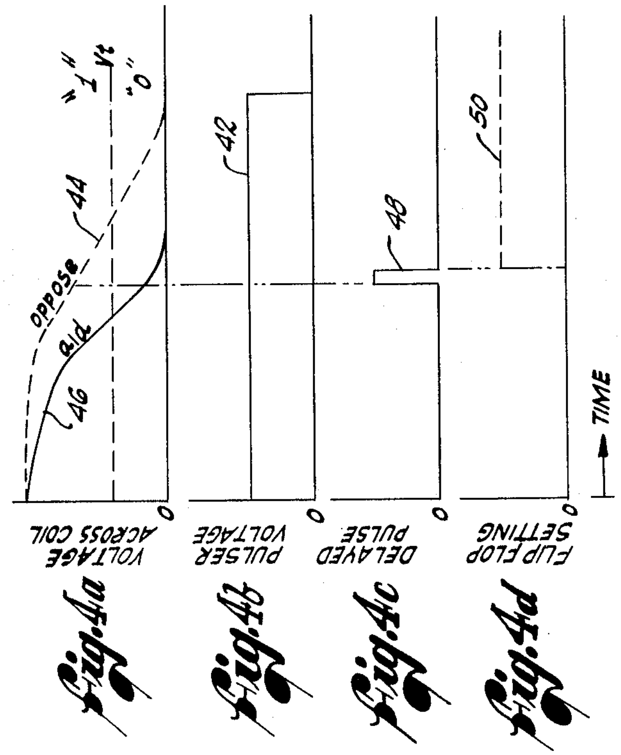

WIth reference to FIGS. *4a* and *4c*, a pulse 48 from the delayed pulse generator 40 is applied to each of the flip-flops 36 at a time determined to be that where the decaying voltages for the opposing and aiding relationships are approximately equidistant from the voltage threshold $V_t$, of the input gate of the flip-flop. Thus, the voltage 44 for the opposing relation is above such threshold, thereby causing the flip-flop to develop a high or "1" output. For the aiding relation, the voltage 46 is below such threshold, in which case the flip-flop develops a low or "0" output. In FIG. 4d, the dotted voltage 50 represents the "1" setting of the flip-flop for the opposing relation. For the aiding relation, the output voltage level of the flip-flop remains at zero.

Thus, the output network 38 has a plurality of data bits simultaneously applied thereto which represent the orientations and distributions of the card spots. The output network may processes the data for any desired purpose, e.g., to compare it with stored data and provide a signal indicating whether the card code is valid to respond to different portions of the data to operate different mechanisms, etc.

FIG. 5 illustrates a phase detection system in accordance with the invention. In this arrangement, a single flip-flop 36 is employed, and the coils 28 are serially connected to one input thereof. For this purpose, each coil at one end has connections to a commutation network 54 which normally maintains an open circuit condition between the coils and the input to the flip-flop. The commutation network 54 is connected to the pulser 32, and suitable counter and decoding means in the network 54 responds to pulses from the pulser 32 to individually close the connections between the coils and the flip-flop in a predetermined sequence.

As shown, a current limiter 56 is connected to the source 34, and each coil is adapted to be connected to the limiter and be energized when it is selected by the commutation network 54. FIGS. *6a* and *6b* illustrate the effect of current limiting. During the occurrence of a pulse 58 from the pulser 32 (FIG. *6c*), the current through a coil builds up to a maximum level, Imax, determined by the limiter 56. At that limit, the voltage across the coil falls off sharply due to the fact that there is no further change of current therein. Further, as will be observed by inspection of the dotted curve 60 and solid curve 62 in FIG. *6b*, the current builds up to the level Imax, much more rapidly where the magnetic fields of the coil and associated card spot are in aiding relation than it does where such fields are in opposing relation. In FIG. *6a*, curve 64 illustrates the voltage collapse across a coil at the time $t_1$ at which the current limit is reached where the coil and spot fields are in aiding relation. Curve 66 illustrates the voltage collapse across the coil at a time $t_2$ at which the current limit is reached for the situation where the coil and spot fields are in opposing relation.

It will be observed that the arrangement of FIG. 5 is one in which resistors are not connected in series with the coils. Accordingly, the voltage across a coil remains substantially constant during current build up therein. The magnitude of such voltage is well above the threshold of the gate circuitry in the flip-flop 36, and this is so whether the coil and spot fields are in aiding or opposing relation. Therefore, whenever a gate pulse 68 (FIG. *6d*is applied to the flip-flop from the delayed pulse generator 40, the output of the flip-flop will be high, or "1", (FIG. *6e*), if a voltage is present.

The determination as to whether the field of a card spot is in aiding or opposing relation to that of the associated coil is made by applying the gate pulse (FIG. *6d*) between the times $t_1$, $t_2$. If the fields are in aiding relation, the voltage across the coil will have collapsed by the time the pulse from the generator 40 is applied to the flip-flop, and in such case the output of the flip-flop is low, or "0". In the example shown, a "0" output from the flip-flop signifies that the pole of a card spot at the upper surface of the card 20 is a south pole. If the field of the energized coil is in opposing relation with that of the associated card spot, the high voltage exists across the coil when the pulse from the generator 40 is applied to the flip-flop, whereupon the output of the flip-flop will be high or "1." In the illustrated arrangement, a "1" output from the flip-flop signifies that the associated card spot is oriented so that its north pole is at the upper surface of the card. The flip-flop is reset after each operation.

An illustration and description of operation of the gating and logic circuitry of a flip-flop of the type illustrated is disclosed in the publication "Motorola Digital Integrated Circuits" (Motorola Semiconductor Products, Inc., July 1968 ). It will be understood, however, that this invention is not limited to the use of a particular type of logic circuit, but embraces any suitable means for effecting a binary logic output that is identifiable with the field orientation of a card spot with which a particular coil is associated.

Further, it will be appreciated that while the amplitude detection scheme of FIG. 3 employs parallel excitation of the electromagnets, and the phase detection scheme of FIG. 5 employs serial excitation of the electromagnets, this invention embraces the arrangement of FIG. 3 wherein the coils are serially excited, and the arrangement of FIG. 5 wherein the coils are excited in parallel.

In a detection system in accordance with the invention, parallel excitation is best employed where the card spots, and hence the electromagnets, are spaced apart sufficiently to avoid undesired coupling between coils of adjacent electromagnets. Serial excitation is the better mode for reading cards wherein the spots are closely packed, and hence require electromagnets that are correspondingly closely spaced together.

This invention also embraces a combination of serial and parallel excitation of electromagnets. For example, a credit card of conventional size may have several dozen magnetized spots arranged in a plurality of rows and columns. The electromagnets are similarly arranged. The electromagnets may be energized in groups within which they are sufficiently spaced to avoid undesired coupling between them when they are energized. By successively energizing the coils of different groups of electromagnets, reading of the data encoded in a card is effected more rapidly than is possible by serial excitation alone, but in a manner which permits data packing to an extent that is permissible with serial excitation alone.

FIG. 7 illustrates a system in accordance with the invention for effecting serial and parallel excitation of the electromagnets. In this arrangement, pulsers are illustrated by normally open switches 70, 72 connected to the voltage source 34. Each of alternate coils 28 is connected in series with a respective resistor 30 between ground and the fixed contact of the switch 70. Similarly, the other alternate coils are shown connected in series with respective resistors 30 between ground and a fixed contact of the switch 72. Respective detectors 74 are connected across the resistors 30, and have outputs connected to the output network 38. Closing the switch 70 causes a voltage pulse to be applied simultaneously to each of the serially connected coil-resistor arrangements connected to its fixed contact. Each of the associated detectors 74 senses the voltage across the associated resistor 30, and develops a high or low output depending upon whether the voltage across the associated resistor exceeds a predetermined level, such level being determined by whether the field of the coil is in aiding or opposing relation with that of the associated card spot. In similar fashion, the switch 72 is closed after the switch 70 is opened, thereby to effect similar operations by the detectors 74 associated therewith.

We claim:

1. In combination:

an assembly of parallel electromagnetic sensors, each having a coil surrounding a core that has high initial permeability and high flux density at saturation;

means to support a magnetic card having a plurality of magnetized spots, wherein respective card spots and sensors are aligned;

means for applying a voltage pulse to each coil to energize it, the voltage across any such coil having one characteristic where the coil and spot fields are in aiding relation, and another characteristic where the coil and spot fields are in opposing relation;

and logic circuit means developing a respective binary logic level output from the voltage across each coil, wherein the logic level is low if the voltage has one characteristic and high if the voltage has the other characteristic.

2. The combination of claim 1, wherein the circuit means has an operational threshold, and wherein, a predetermined time after a pulse is applied to a coil, the voltage across the coil is below such threshold if the coil and spot fields are in aiding relation, and above such threshold if the coil and spot fields are in opposing relation.

3. The combination of claim 2, wherein the circuit means has an operation threshold, and wherein, a predetermined time after a pulse is applied to a coil, the voltage across the coil is above such threshold only if the coil and spot fields are in opposing relation.

4. The combination of claim 1, including means to simultaneously apply a voltage pulse to all coils.

5. The combination of claim 1, including means to apply a voltage pulse to one coil at a time, and in a predetermined sequence.

6. The combination of claim 1, including means to sequentially apply a voltage pulse simultaneously to the coils of different groups of coils.

7. The combination of claim 4, including a respective resistor connected in series with each coil, said series connected resistors and coils being connected in parallel, the voltage pulse being applied across each series connected resistor and coil;

respective logic circuits in said circuit means having inputs connected to respective resistor-coil junctions, each logic circut having a gate input and output;

a delayed pulse generator connected to said gate inputs and operable by the voltage pulse to apply a pulse to said gate inputs at said predetermined time;

and output network means having respective input connections from the outputs of said logic circuits.

8. The combination of claim 5, wherein said circuit means has a level input, connected to said coils, a gate input, and a level output;

current limiting means connected to said coils;

means for selectively applying a voltage pulse to each coil;

a delayed pulse generator, said generator being connected to said gate input and operable by each voltage pulse to apply a pulse to said gate input at said predetermined time;

and output network means connected to said level output.

* * * * *